(12) United States Patent
Annan et al.

(10) Patent No.: US 11,339,544 B2
(45) Date of Patent: May 24, 2022

(54) HYBRID PIPE FOR STAY CABLE AND ITS MANUFACTURING METHOD

(71) Applicant: VSL International AG, Bern (CH)

(72) Inventors: Rachid Annan, Rapperswil (CH); Andreas Schwarz, Bern (CH)

(73) Assignee: VSL INTERNATIONAL AG, Bern (CH)

( * ) Notice: Subject to any disclaimer, the term of this patent is extended or adjusted under 35 U.S.C. 154(b) by 0 days.

(21) Appl. No.: 16/474,915

(22) PCT Filed: Jan. 10, 2017

(86) PCT No.: PCT/EP2017/050432
§ 371 (c)(1),
(2) Date: Jun. 28, 2019

(87) PCT Pub. No.: WO2018/130271
PCT Pub. Date: Jul. 19, 2018

(65) Prior Publication Data
US 2019/0330808 A1  Oct. 31, 2019

(51) Int. Cl.
*F16L 3/26* (2006.01)
*E01D 19/16* (2006.01)
(Continued)

(52) U.S. Cl.
CPC .............. *E01D 19/16* (2013.01); *D07B 1/148* (2013.01); *D07B 1/162* (2013.01); *F16L 3/1226* (2013.01);
(Continued)

(58) Field of Classification Search
CPC .... F16L 3/00; F16L 3/26; F16L 55/00; H02G 7/12
(Continued)

(56) References Cited

U.S. PATENT DOCUMENTS 3,872,894 A * 3/1975 Streit .................... F16L 47/065
138/155
4,096,887 A * 6/1978 Streit ........................ F16L 9/18
138/115
(Continued)

FOREIGN PATENT DOCUMENTS

DE       3529001 A1    2/1987
DE      19906374 A1    9/2000
(Continued)

OTHER PUBLICATIONS

International Search Report and Written Opinion in PCT/EP2017/050432 dated Sep. 8, 2017, 10 pages.
(Continued)

*Primary Examiner* — Patrick F Brinson
(74) *Attorney, Agent, or Firm* — Pearne & Gordon LLP

(57) ABSTRACT

The present invention relates to a hybrid pipe (1) for stay cable, comprising a tubular shaped wall (15), the wall having an internal face (18) and an external face (19). The hybrid pipe (1) further comprises at least one reinforcing element (12, 22), the reinforcing element (12, 22) being provided at the wall (15) to form the hybrid pipe (1) such that the hybrid pipe (1) has a higher mechanical properties/resistance such as higher buckling resistance, higher tensile strength and/or a lower thermal dilatation than the wall (15) itself. The present invention also relates to a cable-stayed system comprising such a hybrid pipe (1) and a method of manufacturing such a hybrid pipe (1).

20 Claims, 6 Drawing Sheets

(51) Int. Cl.
*D07B 1/14* (2006.01)
*D07B 1/16* (2006.01)
*F16L 3/12* (2006.01)
*H02G 3/04* (2006.01)

(52) U.S. Cl.
CPC ........ *F16L 3/26* (2013.01); *D07B 2501/2015* (2013.01); *H02G 3/0406* (2013.01); *H02G 3/0481* (2013.01)

(58) Field of Classification Search
USPC ............... 138/106, 108, 172, 120, 155, 109; 174/99 R
See application file for complete search history.

(56) References Cited

U.S. PATENT DOCUMENTS

| | | | | |
|---|---|---|---|---|
| 4,288,108 A * | 9/1981 | Streit | ............... | H02G 9/06 285/149.1 |
| 4,449,852 A * | 5/1984 | Muszynski | ......... | F16L 13/0272 405/168.2 |
| 4,808,031 A * | 2/1989 | Baker | .................... | F16L 1/123 138/172 |
| 5,479,671 A | 1/1996 | Stubler et al. | | |
| 6,197,395 B1 * | 3/2001 | Van Vechten | ............. | F16L 9/14 138/173 |
| 6,450,207 B2 * | 9/2002 | Villatte | ............... | F16L 13/0272 138/172 |
| 6,460,574 B2 * | 10/2002 | Currie | ....................... | E03F 3/04 138/116 |
| 6,536,480 B2 * | 3/2003 | Guesnon | ................. | F16L 13/04 138/172 |
| 6,604,549 B2 * | 8/2003 | Gauthier | ................. | F16L 55/26 138/103 |
| 7,950,093 B2 | 5/2011 | Brand et al. | | |
| 8,978,711 B2 * | 3/2015 | Satou | ................... | B21C 23/085 138/115 |
| 9,238,118 B2 * | 1/2016 | Woelfel | ............ | A61M 16/0875 |
| 2003/0056844 A1 * | 3/2003 | Gauthier | ................... | F16L 7/00 138/108 |
| 2005/0201832 A1 * | 9/2005 | Edfeldt | ................... | F16L 1/123 405/159 |
| 2007/0039659 A1 * | 2/2007 | Coel | ...................... | F16L 11/115 138/173 |
| 2008/0178956 A1 * | 7/2008 | Willingham | .............. | F16L 9/19 138/108 |
| 2008/0241714 A1 * | 10/2008 | Chang | ................. | G03F 7/70616 430/30 |

FOREIGN PATENT DOCUMENTS

| | | |
|---|---|---|
| DE | 102007017697 A1 | 10/2008 |
| WO | 8809847 A1 | 12/1988 |
| WO | 2018020289 A1 | 2/2018 |
| WO | WO2018072902 A1 † | 4/2018 |

OTHER PUBLICATIONS

Examination report issued in corresponding European patent application No. 17700325.8 dated Jul. 9, 2020, 5 pages.
"Cable stays: Recommendations of French Interministeral Commission on Prestressing." Service d'Etudes Techniques des Routes et Autoroutes, Centre des Techniques des Ouvrages d'Art. Jun. 2002. 5 pages.
Dechamps, Renaaud. "Pont Eric-Tabary." 2011. 4 pages.
"Pont Eric-Tabarly Inauguration." Dossier de Presse. Jun. 17, 2011. 12 pages.
English Translation of "Éric-Tabarly Bridge, Marc Barani-Setec tpi-Nantes Métropole."2011 (cited previously).
English Translation of "Inauguration of the Eric-Tabarly Bridge."2011 (cited previously).

\* cited by examiner
† cited by third party

HYBRID PIPE FOR STAY CABLE AND ITS MANUFACTURING METHOD

TECHNICAL FIELD OF THE INVENTION

The present invention relates to the technical field of stay cables. In particular, the present invention relates to tensile members used in construction comprising of high strength steel stay cables that are applicable to masts, towers, bridges, footbridges, roofs for stadiums or other similar structures.

BACKGROUND OF THE INVENTION

Due to their structural and economic advantages, more cable-stayed structures such as guyed masts and towers, footbridges, bridges or suspended roofs have been built over the last few decades. Achievable dimensions such as span length or mast heights and lengths of the stay cables have also increased considerably. To this end, conventional stay pipe has reached its limits to support its self-weight, under compression force (which causes buckling) as well as under tension force (which causes tensile failure). Furthermore, it presents strong limitation due to its high value of coefficient of thermal dilatation.

A cable-stayed (or guyed) tower or mast has a substantially vertical element built typically of steel or concrete resting on a foundation and one or more stabilizing cables running from the tower radially outwards to anchor fix points such as gravity or self-anchored foundations. The stay cables provide the necessary lateral stiffness of the tower or mast against horizontal loads and limits the resulting bending moments in the tower shaft and the overturning moment on its foundation.

Similarly, a cable-stayed bridge has one or more towers (or pylons), from which cables support the bridge deck. A distinctive feature are the cables which run directly from the tower to the deck, normally forming a fan-like pattern or a series of parallel lines. This is in contrast to the modern suspension bridge, where the cables supporting the deck are suspended vertically from the main cable which itself is anchored at both ends of the bridge and running between the towers. In the same way a bridge deck can be supported by stay cables, roofs or other suspended structures can also be carried by such tensile members.

Stay cables used to be manufactured in a factory and subsequently assembled from parallel or locked coil wires. Later on, a high quality of seven-wire high tensile steel strands was developed for stay-cable applications. It was used in prefabricated stay cables installed in bridges using heavy equipment. These strands were placed in a steel or PE pipe and protected against corrosion and mechanical damage by cement grouting.

Later on, similar seven wire strands were protected against corrosion by extruding a polyethylene (PE) sheathing around the steel strands and filling its interstices with suitable corrosion inhibiting fillers such as grease or wax. These strands did not have to be protected by cement grouting against corrosion and could be simply placed inside a protective tubular shaped outer pipe. Installation methods were developed to facilitate the in-situ fabrication of a cable stay by threading the pre-fabricated strands on site one by one, or by a limited number of strands, into a steel or PE Pipe that is suspended with the first strand (s) or another supporting cable. This has allowed the use of lightweight equipment for the site works and has simplified temporary works required for the erection of such cables due to the use of individual elements and tools weighting 5 to 10 times less than with a full prefabricated cable stay.

Since the feasibility and performance of a cable-stayed structure essentially depends on its stay cable properties, it becomes increasingly necessary to further improve the existing technology and develop a new, better and modern stay cable system in order to meet the demands of the modern society asking for new infrastructures with increasing span lengths or heights.

A stay cable typically has a tubular shaped outer pipe (also known as duct or tube) which is mainly used to protect strand bundles within the pipe from direct exposure to the environment factors such as sun, rain and pollution. The pipe can also provide some degree of mechanical protection. Furthermore, the pipe is necessary to be able to prevent wind-induced rattling of the strands and to provide an optimized aerodynamic cross section by adding ribs or dimples such as to limit wind drag forces and to control the risk of wind-induced, or wind and rain-induced vibration.

Pipes for stay cable can be made of double layer of PE with a black inner layer and a coloured outer layer for the obvious reason of cost effectiveness. The stabilization of coloured PE pipe is suitable against ageing (colour fading, cracking) but it is more expensive than the black material. This type of pipe may not be sufficient to meet the high requirement of a stronger pipe due to the longer sizes required for modern bridges or buildings. Moreover, the higher expansion coefficients for plastic materials including PE and high-density PE (HDPE) cause the pipe made from such materials to expand significantly more than the steel strands under temperature changes. Using steel pipes instead is not a suitable solution due to the increased weight and additional cost-related issue for protecting these pipes against corrosion.

Due to the pipe not being connected monolithically with the strand bundle, conventional pipe is subject to mechanical loading by its own weight. In most cases, the pipe is resting on the strand bundle, supported at their lower end by a stopper and hence are in compression. Therefore, in order to avoid buckling, the thickness of the pipe has to be generally big enough so that it can provide sufficient resistance against buckling. However, this poses the problem of additional weight, cost and added difficulty for installation resulting from the very long and/or more verticals cable stays.

An alternative arrangement could also be in suspending the pipe from its upper end. In this case, the pipe is in tension. However, this requires special connections to suspend the pipe typically using friction or welding to transfer forces. Such connections have proven to be susceptible to ageing, quality defects and premature failure in tension and are hence not the preferred solution.

Buckling strength of a member depends not only on its material strength, but also on its stiffness and supporting conditions. The installation process of modern strand stay cables with subsequent pulling-in of individual strands one-by-one using winches requires a certain installation space to make room for pulling connectors and winch ropes. Filling ratios are typically limited to below 80% or below 60% of the full load capacity of the pipe, depending on installation methods. As a result the pipe rests on the upper layer of strands by bearing and friction but remains otherwise radially and longitudinally unrestrained. The support is further reduced during installation stage before all strands are installed or in case the cable vibrates causing the friction to disappear. This causes unfavourable support conditions which tend to increase the chance of pipe buckling.

Apart from the aforementioned installation process, the filling ratio of the strand bundles inside the pipe might be further reduced as there is a need to leave some free space permanently for other purposes such as, but not limited to, installation and maintenance of electrical supply cables for lighting or monitoring, fibre optic cables for data transfer or supply lines for de-humidification, heating or other secondary systems.

The free dilatation of conventional stay pipes over typical temperature ranges can reach values of up to 1% of cable length. This requires the use of very long expansion sleeves to accommodate the movement of the pipe relative to the strands. Such expansion sleeves are expensive, difficult to install and maintain and can present a weak point for the durability of the stay cable when dust, water or pollutants enter the movement gap.

SUMMARY OF THE INVENTION

The inventors of the present invention have found out effective remedies for the above-discussed problems by introducing a new hybrid pipe. Thanks to the strength and shape of the reinforcing element, a hybrid pipe according to the present invention provides for increased mechanical properties/resistance (e.g. higher buckling resistance and higher tensile strength), thereby allowing the installation of very long stay cables while minimizing the buckling phenomenon. Furthermore, the hybrid pipe of the present invention also allows the coefficient of thermal expansion (or dilatation) to be self-compensated to a certain extent, thereby eliminating the need for costly expansion and un-aesthetically sleeves which need to be fixed at one or both ends of the pipes. This is achieved by activating the hybrid action of the pipe and the reinforcing element which increases the stiffness and results in a thermal expansion coefficient of the hybrid which is significantly lower than that of the pipe alone.

According to a first aspect of the invention, there is provided a hybrid pipe for stay cable. More specifically, the first aspect of the invention relates to a hybrid pipe for stay cable, comprising a tubular shaped wall, the wall having an internal face and an external face and further comprising at least one reinforcing element, wherein the reinforcing element is provided at the wall to form the hybrid pipe such that the hybrid pipe has a higher mechanical resistance (for instance higher buckling resistance, higher tensile capacity) and/or lower thermal dilatation than the wall itself.

According to a second aspect of the invention, there is provided a stay cable system comprising the hybrid pipe according to the present invention.

According to a third aspect of the invention, there is provided a method of manufacturing a hybrid pipe for stay cable. In more detail, it relates to a method of manufacturing a hybrid pipe for stay cable, comprising the step of (a) connecting a plurality of pipes to obtain a required length, wherein the pipe has a tubular shaped wall, and (b) attaching at least one reinforcing element on the wall. The reinforcing element can be of a continuous, joint less type or alternatively be formed by jointing individual sections by bolting, riveting, welding, clamping or other means.

In a first embodiment of the present invention, the reinforcing element is attached at the wall in a watertight way. Such a configuration has the advantage that components installed within the hybrid pipe are not subject to external environment factors, i.e. rain.

In one preferred embodiment of the invention, the reinforcement element is attached at the wall in such a way that at least one longitudinal pocket area is formed along the wall. Therefore, such a reinforcing element not only increases mechanical properties of the pipe such as an increased buckling resistance and a higher tensile strength, but it also creates additional spacing and/or voids such that other components like electrical cables, fibre optic cables, or other optional devices such as conduits for fluids or gases could be accommodated separately from the strands within the empty spacing of the pocket area.

In another embodiment of the invention, the reinforcing element has a curved profile forming one or more channels which may be open or closed, wherein the channel is able to accommodate one or more high strength tensile elements such as steel strand wires, fibre wires or high strength ropes.

According to another embodiment of the invention, the reinforcing element is a longitudinal plate, preferably comprising a plurality of openings provided at regular intervals. Such a reinforcing element could substantially increase the mechanical properties of the pipe but does not create additional spacing i.e. a pocket area. Such a reinforcing element is thus suitable to be fixed at the external or internal face of the wall. Furthermore, the openings provided at the reinforcing element could further reduce its weight.

In one preferred embodiment, the reinforcing element is made of at least one metal element such as steel, iron or an alloy thereof. Such metal materials may be suitable to make the hybrid pipe even stronger through creating a hybrid pipe (or composite pipe), which is a plastic pipe with a metal reinforcing element. The metal element and the plastic pipe may be connected at regular intervals or continuously in order to activate a composite action.

In another embodiment, the metal elements and the thermoplastic pipe may be locked together at each pipe end and/or at intermediate locations, for example joints between successive pipe sections, such as the resulting shear force in the connections between the metal element and the plastic pipe under differential temperature dilatation can be limited. Such a hybrid pipe has higher mechanical properties (e.g. increased buckling resistance and tensile strength) and such hybrid pipe experiences less thermal dilatation, thereby eliminating the need for expensive and difficult to install and maintain expansion sleeves required at the pipe ends in order to compensate the dilatation of the plastic pipe.

In another embodiment, the hybrid pipe of the present invention comprises a plurality of openings that are provided on the wall corresponding to the reinforcing element. Such openings may match the openings of the reinforcing element. These openings may be arranged in such a way that they give access from the outside of the hybrid pipe to the pocket area formed by the reinforcing element such that optional devices such as light elements could be installed in the openings and connected for example to electrical cables running inside the pocket area. The interface between the reinforcing element and the hybrid pipe can be sealed in this case by a joint seal to prevent ingress of water or pollutants through the openings into the pipe space housing the strands which allows for an opening of the wall of the pipe without adverse effects on the strands.

In one embodiment, the reinforcing element having a curved profile is provided at the internal face of the wall whereas the reinforcing element having a profile of a longitudinal plate is provided at the external face of the wall. Such a configuration would render a double strength of reinforcement to both sides of the wall. In addition to that, a unique empty spacing could also be created within the hybrid pipe.

According to a yet another embodiment, the hybrid pipe further comprises optional devices such as lighting elements and/or heating elements and/or surveillance elements which are installed at the openings of the wall and within the pocket area.

In yet another embodiment, the external face of the wall has one or more ribs and/or dimples. The pipe having such patterns is useful in reducing vibration caused by wind or rain-wind effects for instance. The ribs may be designed in a helical form, or perpendicular to the longitudinal direction of the pipe or in form of parallel strips.

According to another embodiment, the pipe is made of one or more layers of plastic material such as polyethylene (PE) and/or high-density polyethylene (HDPE). Pipe made of PE or HDPE has lesser weight compared to other materials such as metal. Moreover, pipe made of such material could easily be provided with different surface patterns or ribs or colours.

In one preferred embodiment, two, three or more pocket areas or channels are provided at different circumferential positions of the hybrid pipe. Such additional pocket areas or channels allow more optional devices and/or further reinforcing elements such as steel strand wires, fibre wires or high strength ropes to be installed within the hybrid pipe.

According to a further embodiment, a flange and a connector flange are provided at one or both ends of the wall.

In another embodiment, at least one reinforcing element can be mechanically fixed relative to each end of the wall.

In one preferred embodiment, the method further comprises one or more of the following steps: (a) forming at least one pocket area or channel at the wall with the reinforcing element; (b) pulling in or pushing in one or more high strength tensile elements into the channel; (c) pulling in or pushing in one or more high tensile strands into the hybrid pipe; (d) forming at least one opening; and/or (e) assembling light elements and/or heating elements and/or monitoring elements at the openings of the wall with elements, such as cabling, passing through the pocket.

According to another embodiment, the fixing step is performed with the method of bolting, riveting, clamping, screwing, brazing or welding. The method may be chosen depending on the requirement of a hybrid pipe to be made. Additional fixing steps may be used to ascertain that the fixation is water tight.

BRIEF DESCRIPTION OF THE DRAWINGS

The following drawings are not necessarily drawn to scale, emphasis instead is generally being placed upon illustrating the principles of various embodiments. In the following description, various embodiments of the invention are described with reference to the following drawings:

FIG. 3d is a schematic cross-sectional view of the reinforcing element according to the FIG. 3a.

FIG. 4b is an enlarged schematic cross-sectional view of a hybrid pipe according to FIG. 4a.

FIG. 5b is a schematic side view of the reinforcing element according to the FIG. 5a.

DETAILED DESCRIPTION OF THE PREFERRED EMBODIMENT

Figure 1A:
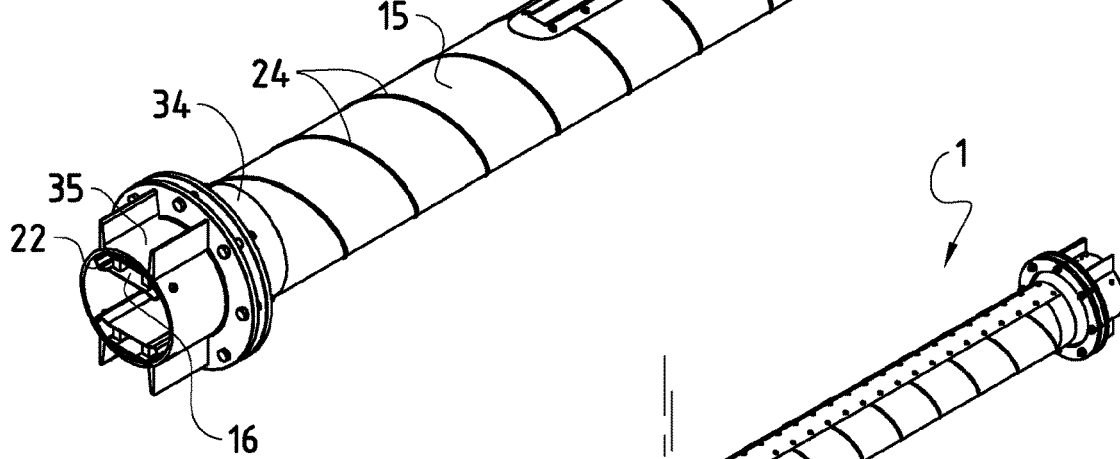
FIG. 1a is a schematic partial overview of the hybrid pipe according to a first embodiment of the present invention.

Several preferred embodiments of the present invention will now be described in detail with reference to the accompanying drawings. In the following description, a detailed description of known functions and configurations incorporated herein has been omitted for conciseness.

FIG. 1 illustrates a schematic overview of a hybrid pipe 1 for stay cable according to a first embodiment of the present invention. The hybrid pipe 1 comprises a tubular shaped wall 15, wherein a plurality of strand bundles could be contained therein. Reinforcing elements 12, 22 are fixed to the internal face 18 and/or external face 19 of the wall 15. A flange 34 and a connector flange 35 may be installed at one or both ends of the wall 15 to form part of the cable stay system for easier fixation to the cable-stayed structure.

As can be seen in the FIG. 1a, two reinforcing elements 12, 22 having different profiles are attached to the wall 15. The reinforcing element 12 having a longitudinal plate sheet is fixed at the external face 19 of the wall 15 whereas the reinforcing element 22 having a curved profile is fixed at the internal face 18 of the wall 15. Such reinforcing element 22 having a curved profile forms a pocket area 16 when it is fixed to the wall 15. These reinforcing elements 12, 22 can be seen in FIGS. 3 and 5 and their respective advantages will be discussed below. Such reinforcing elements 12, 22 may be made of any hard material, but preferably with hard metal such as steel, iron or an alloy thereof. By making use of such a curved, hollow profile, the stiffness and hence buckling resistance of the hybrid pipe can be further increased without having to increase its wall thickness and weight.

According to this embodiment of the invention, a plurality of openings 36 may be provided at the wall 15. These openings 36 correspond to the openings 26 of the reinforcing elements 12, such that optional devices such as lighting elements, heating elements or surveillance elements can be installed therein.

Figure 1B:
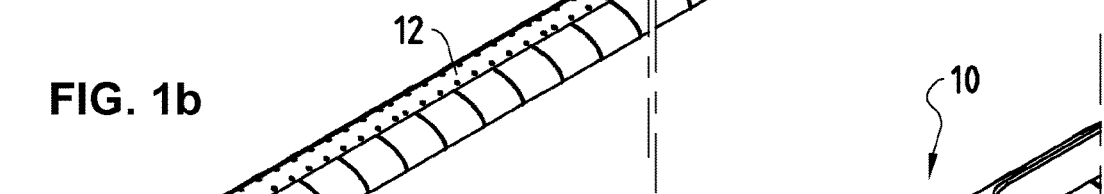
FIG. 1b is a schematic overview of the hybrid pipe according to a second embodiment of the present invention.

FIG. 1b illustrates a second embodiment of the present invention. A reinforcing element 12 having a longitudinal plate strip may be attached to the external face 19 of the wall 15 whereas the reinforcing element 22 having a curved profile may be fixed at the internal face 18 of the wall 15. Such a configuration could render a double strength of reinforcement to both sides of the wall 15 while creating a pocket area 16 in the hybrid pipe 1.

Figure 2:
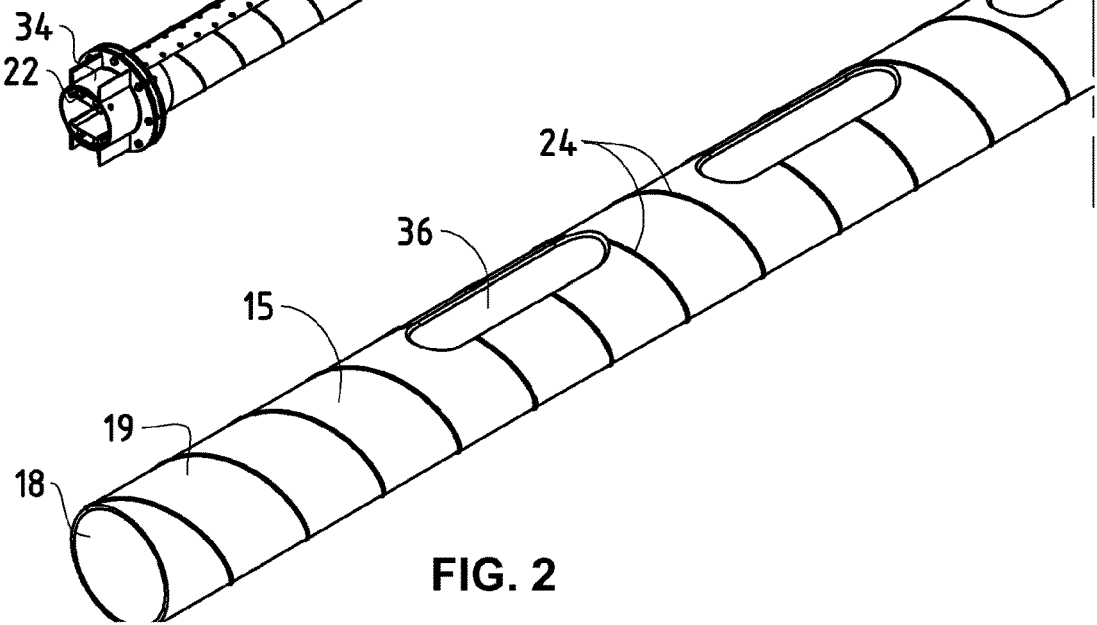
FIG. 2 is a schematic partial overview of the pipe without a reinforcing element.

FIG. 2 shows the pipe 10 of the present invention without reinforcement elements. The pipe 10 has a tubular shaped wall 15 which may be made of thermoplastic material such as PE or HDPE such that it has a minimal weight compared to other material like metal for instance. A plurality of oval shape openings 36 can be provided at the wall 15. Furthermore, in order to reduce vibration caused by external factors such as wind, or by a combination of wind and rain, the external face 19 of the wall 15 may be provided with ribs 24 and/or dimples (not shown). The ribs 24 may be helicoidal around the pipe 10 or may be perpendicular to the longitudinal direction of the pipe 10. It is generally perceived that pipe 10 made of plastic material, although has the advantage of light weight, its compression strength and tensile strength are much lower than pipe made of steel for instance. For this reason, present invention overcomes such weaknesses through fixing the reinforcing element 12, 22 which may be in form of a longitudinal strip or a short repetitive strip at the wall 15 of the pipe 10.

Figure 3A:
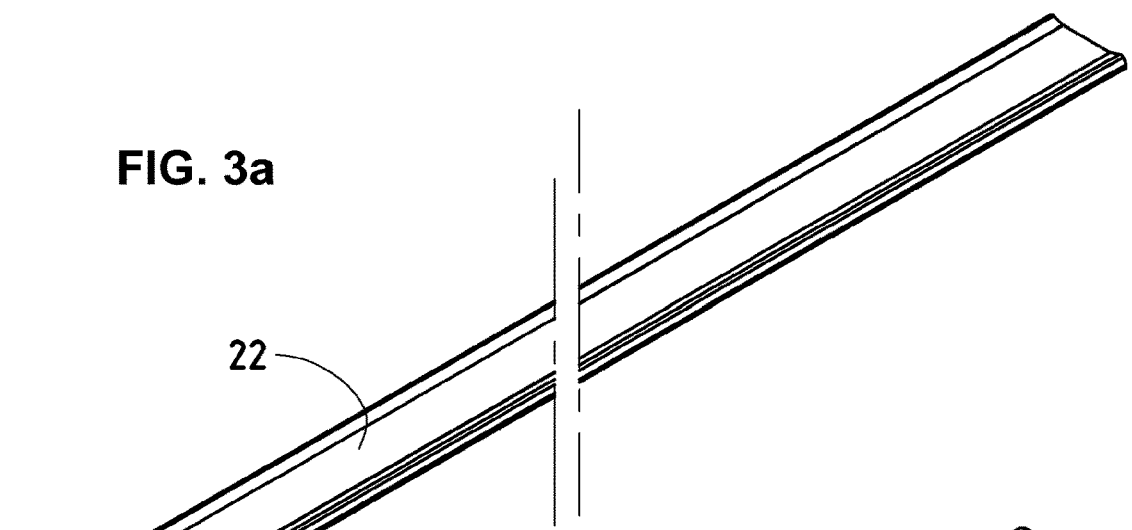
FIG. 3a is a schematic overview of the reinforcing element according to a third embodiment of the invention.
Figure 3B:
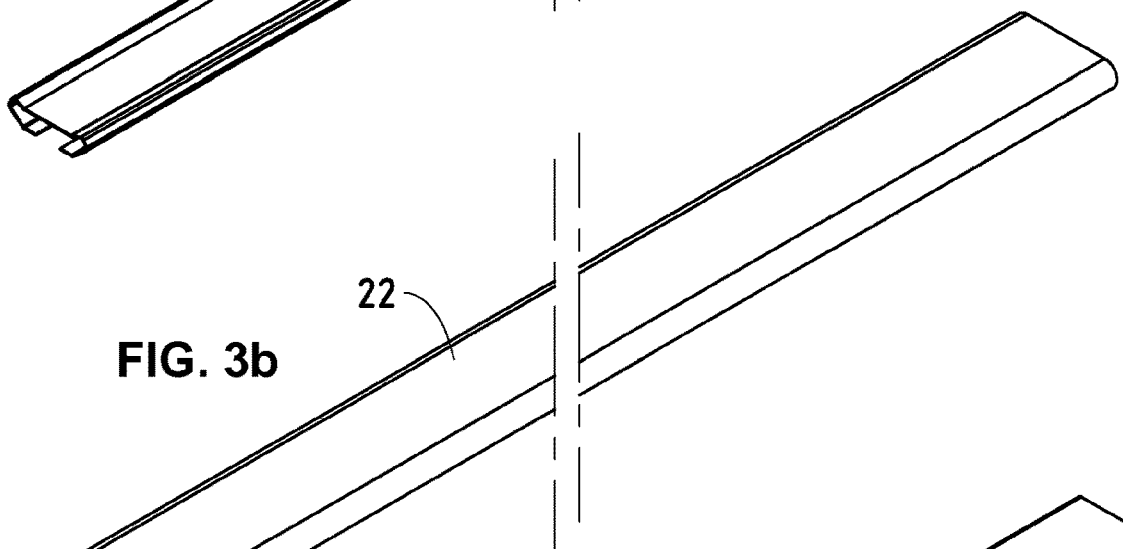
FIG. 3b is a schematic overview of the reinforcing element according to a fourth embodiment of the invention.
Figure 3C:
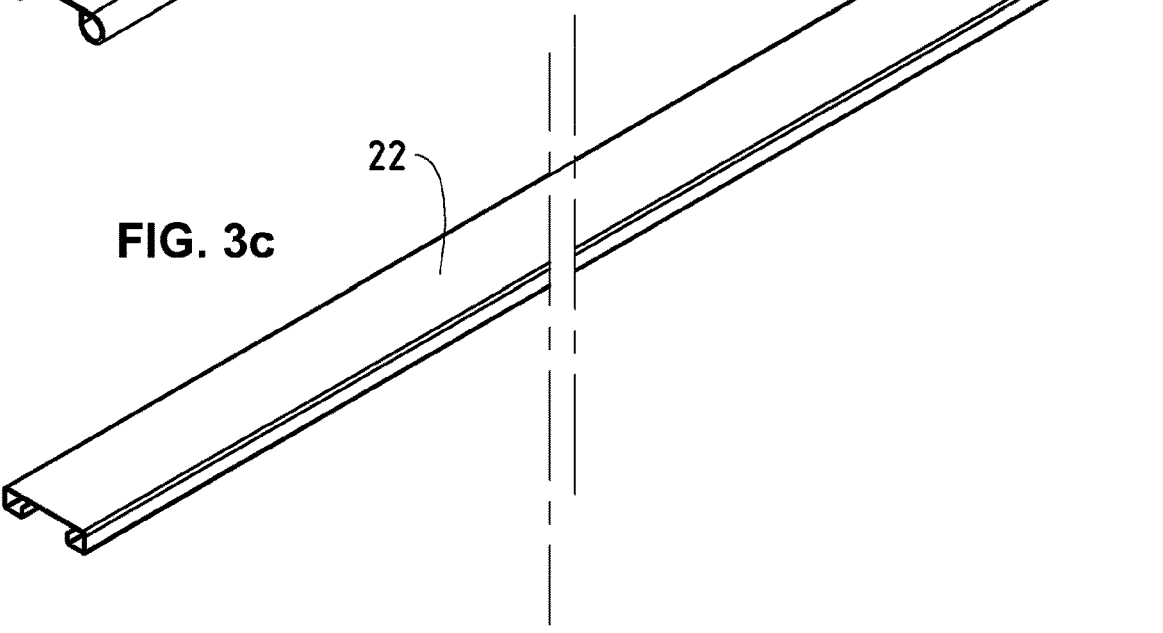
FIG. 3c is a schematic overview of the reinforcing element according to a fifth embodiment of the invention.
Figure 3D:
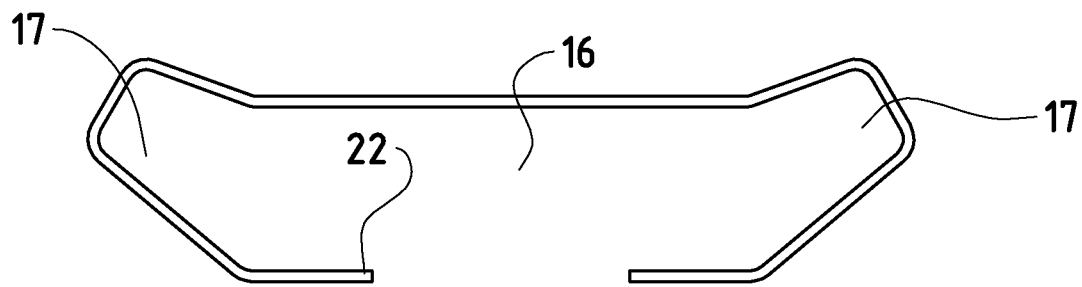
Figure 3E:
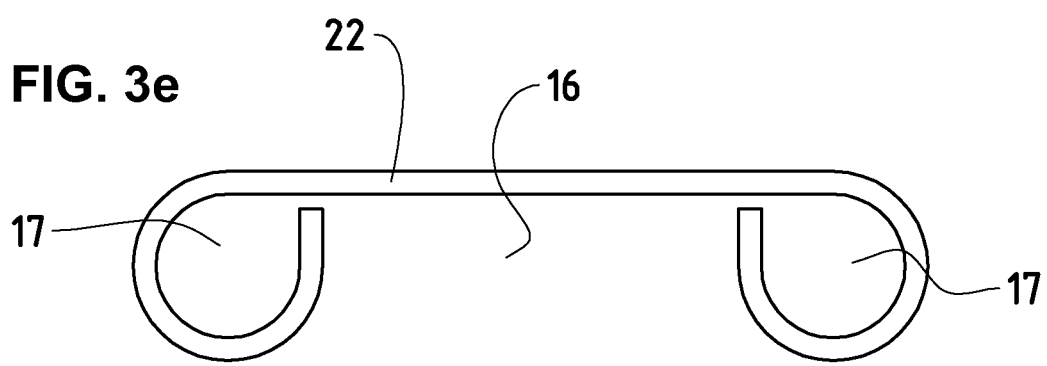
FIG. 3e is a schematic cross-sectional view of the reinforcing element according to the FIG. 3b.
Figure 3F:
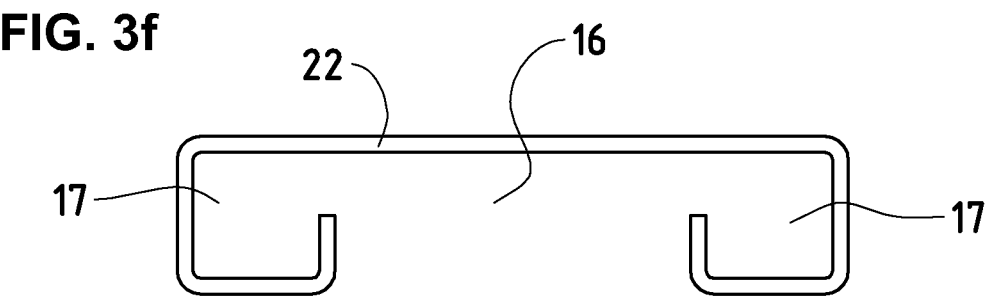
FIG. 3f is a schematic cross-sectional view of the reinforcing element according to the FIG. 3c.

Reinforcing element 22 having different curved profiles are shown in FIGS. 3a to 3c. According to these embodiments of the invention, these reinforcing elements 22 have a curved, partially open profile that has two protruding ends (FIG. 3d) or partially partitioned ends (FIGS. 3e, 3f) at opposite side. These protruding ends or partially partitioned ends may serve as channels 17 which run along the interior face 18 of the tubular wall 15. The channel 17 may be in form of loops (FIG. 3e) or may have corners such as square (FIG. 3f). High strength tensile element 56 can then be accommodated within the channels 17 to provide further reinforcement to the hybrid pipe 1 in order to render higher tensile capacity of the hybrid pipe 1 against tensile failure. Such high strength tensile element 56 could therefore support the weight of the pipe assembly. The reinforcing element 22 is preferably made of materials other than the pipe such that the resulting hybrid pipe 1 could have improved mechanical properties for the application in stay cable.

Figure 4A:
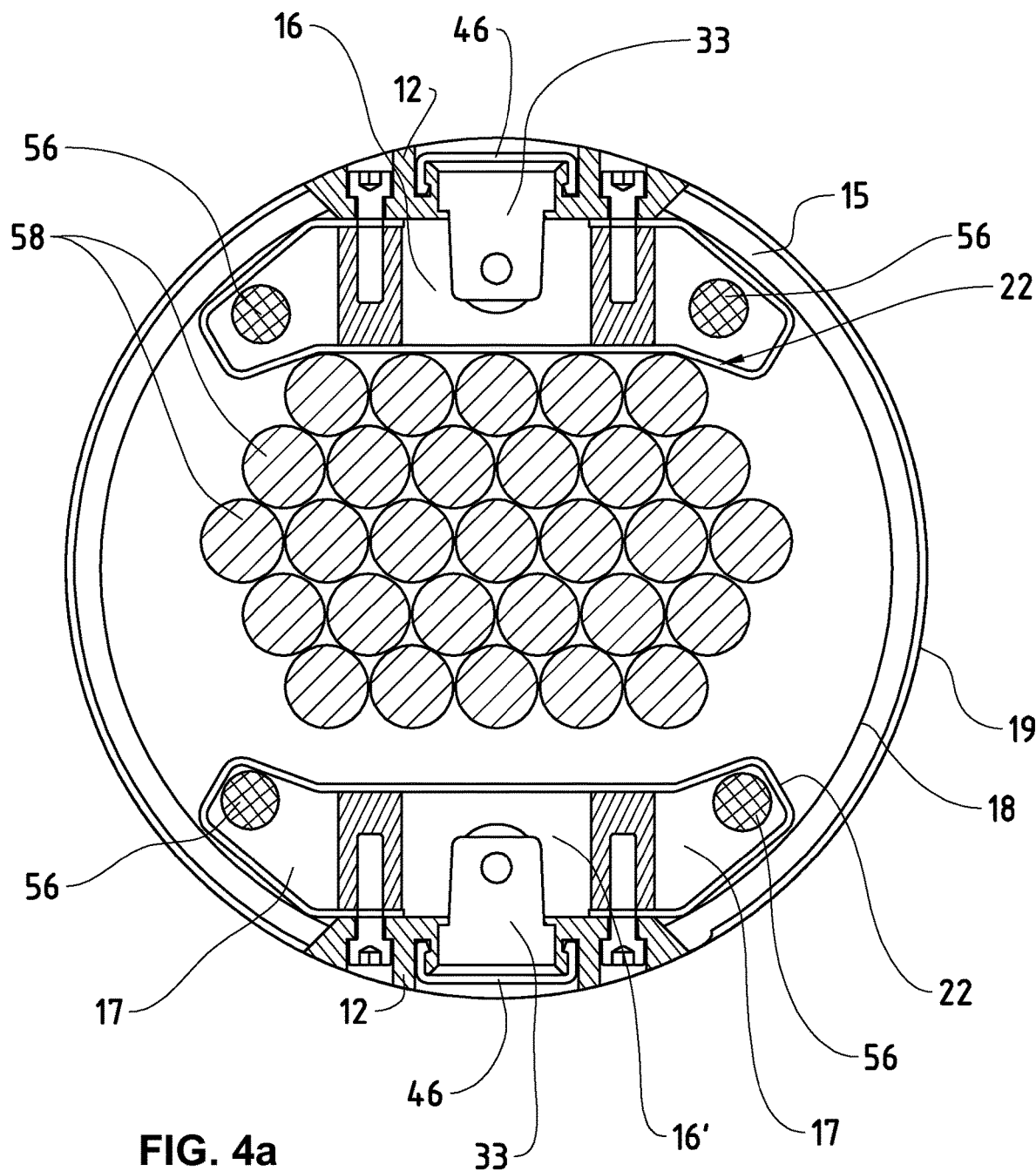
FIG. 4a is a schematic cross-sectional view of a hybrid pipe according to a sixth embodiment of the invention where strand bundles and high strength tensile element are loaded within the hybrid pipe.

This type of reinforcing element 22 may form one or more pocket areas 16, 16' when they are fixed to the wall 15 of the pipe 10, preferably at the interior face 18, as shown in FIG. 4a. Such pocket areas 16, 16' not only create separate spaces within the space of the tubular shaped wall 15, whereby supplementary devices like light sources 33 could be installed therein, but can also serve as channel 17 to insert additional high strength tensile elements 56 to further reinforce the hybrid pipe.

The inventors of the present invention discovered that when at least part of the circumference of the wall of the plastic pipe is reinforced by one or more reinforcing element, the resulting hybrid pipe 1 is particularly suitable for modern stay cable systems. In other words, the hybrid pipe 1 according to the present invention overcome those drawbacks of the conventional pipe by having these improved features or advantages, namely increasing buckling resistance (by increasing the inertia, compression and mechanical resistance of the pipe);
reducing coefficient of thermal expansion (or thermal dilatation coefficient, thereby avoiding the need to use expensive expansion sleeve at one or both ends of the pipe which are also difficult to install and maintain);
higher tensile strength (by having composite material with much higher performance than PE or HDPE);
reducing installation cost (hybrid pipe is self-supporting even in case of pipes with greater length; and
reducing total weight of the stay cable (hybrid pipe having higher tensile strength and compression resistance with similar size); and
reducing the drag coefficient and improving the aerodynamic behaviour of the stay by keeping lower section with very long cable stays; and;
enabling the installation of optional devices in the hybrid pipe.

As can be seen in the FIG. 4a, strands are loaded within the hybrid pipe 1 forming strand bundle 58. Typically a strand bundle 58 is comprised of between 1 and 200 seven wire high tensile steel strands and each strand is made up of one straight central wire (about 5.35 mm) with six wire (about 5.2 mm) on a helicoidally shape, and each strand is surrounded by a PE layer (thickness of about 1.5 mm), and all are filled with grease or wax.

Thanks to the curved profile created by the reinforcing elements 22, pocket areas 16, 16' and channel 17 can be created. Supplementary devices such as light elements 33 could be installed at the pocket areas 16 while high strength tensile elements 56 could be accommodated at the channels 17 which is created by the special profile of the reinforcing element 22.

Figure 4B:
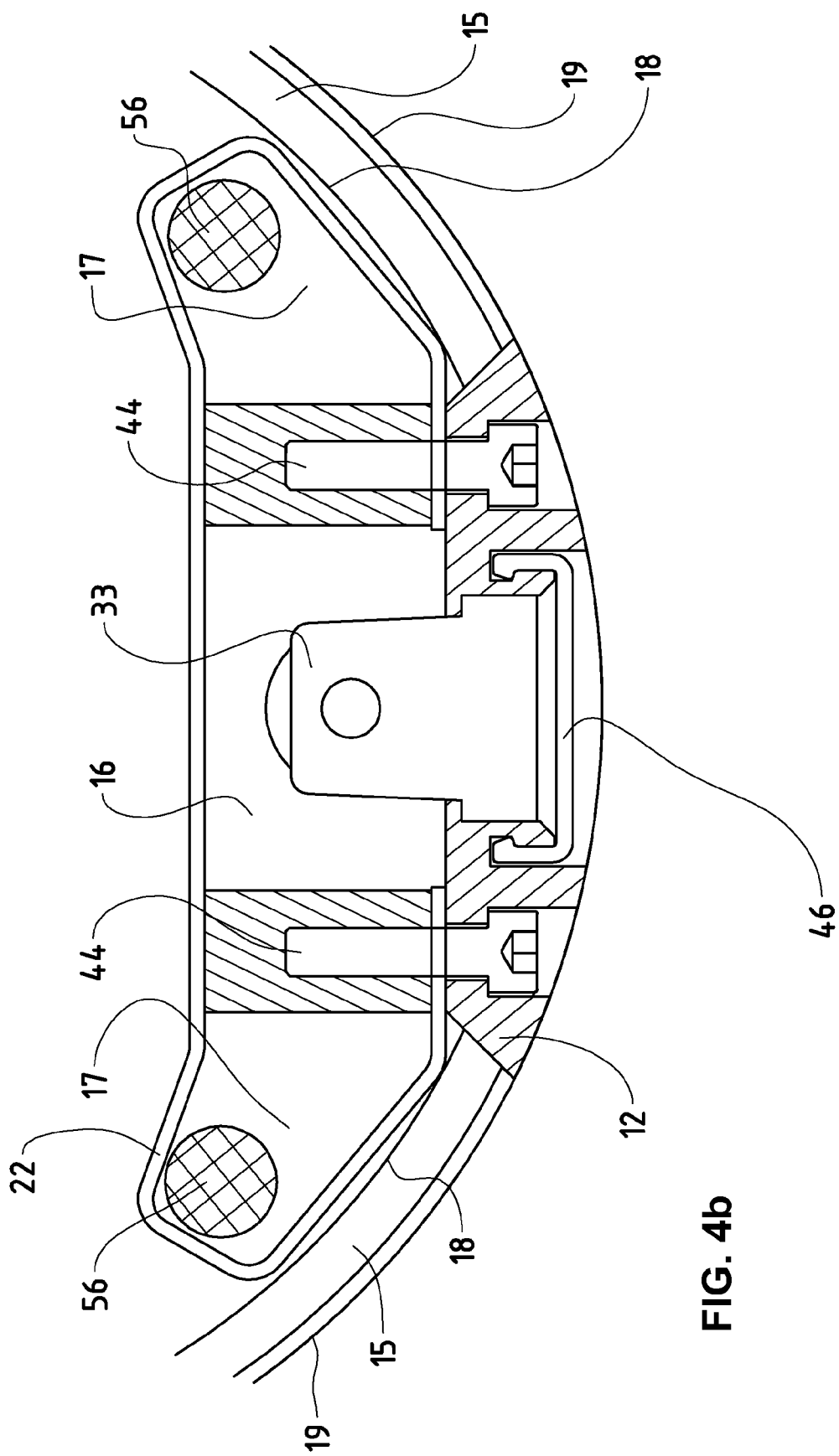

The reinforcing element 22 can be fixed at the wall 15 through fixing means 44 while the supplementary devices 33 may be fixed at the wall 15 through holding means 46 such as a hook for instance, as shown in FIG. 4b. In this example, the reinforcing element 22 having a curved profile provided at the internal face 18 of the wall 15 co-operates with the reinforcing element 12 having a profile of a longitudinal plate to create a "Faraday cage-like" structure, thereby protecting the supplementary device such as light assembly 33 assembled there between while rendering double reinforcement force to the pipe. The pipe 10 may comprise of two layers made of different material (thermoplastic material).

The reinforcing element 12 can be tightened to another reinforcing element 22 through fixing elements 44 (via the method of bolting, riveting, clamping, screwing, brazing or welding), thus allowing transfer of forces at its interface with the pipe 10.

Figure 5A:
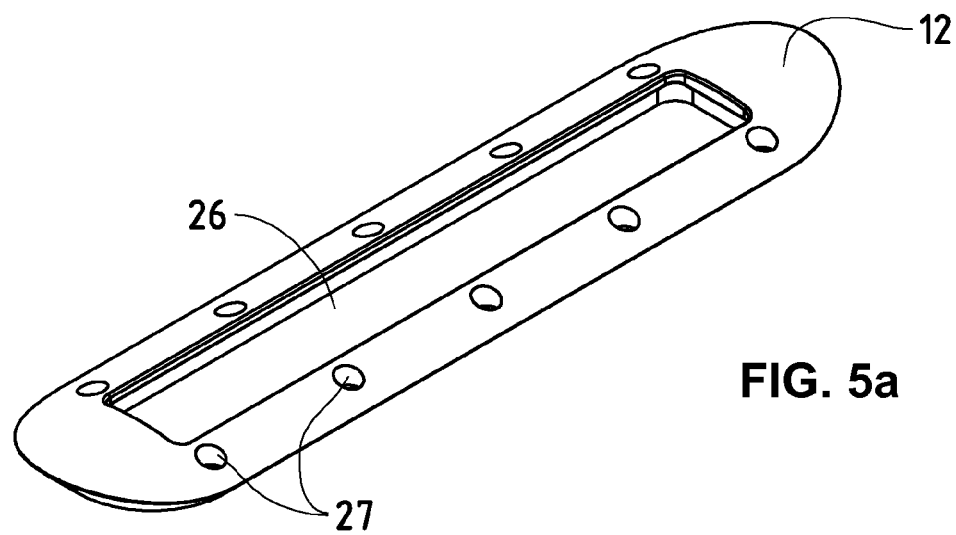
FIG. 5a is a schematic overview of the reinforcing element according to a seventh embodiment.
Figure 5B:
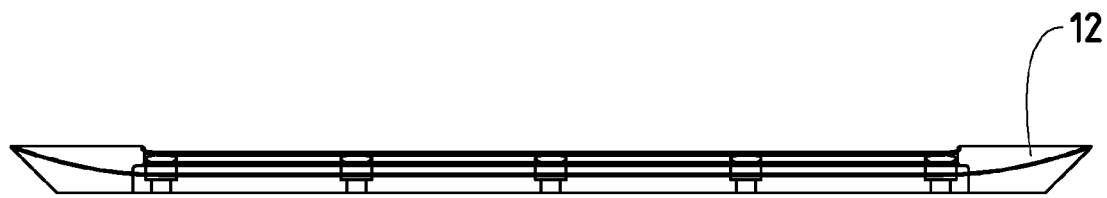

FIG. 5a shows a perspective view of the reinforcing element 12 having a longitudinal plate. The reinforcing element 12 according to this embodiment has a thin, sheet like structure as shown in FIG. 5b. Apart from the rectangular opening 26, a plurality of openings 27 may also be provided at the reinforcing element 12 such that fixing elements 44 could be use.

Figure 6:
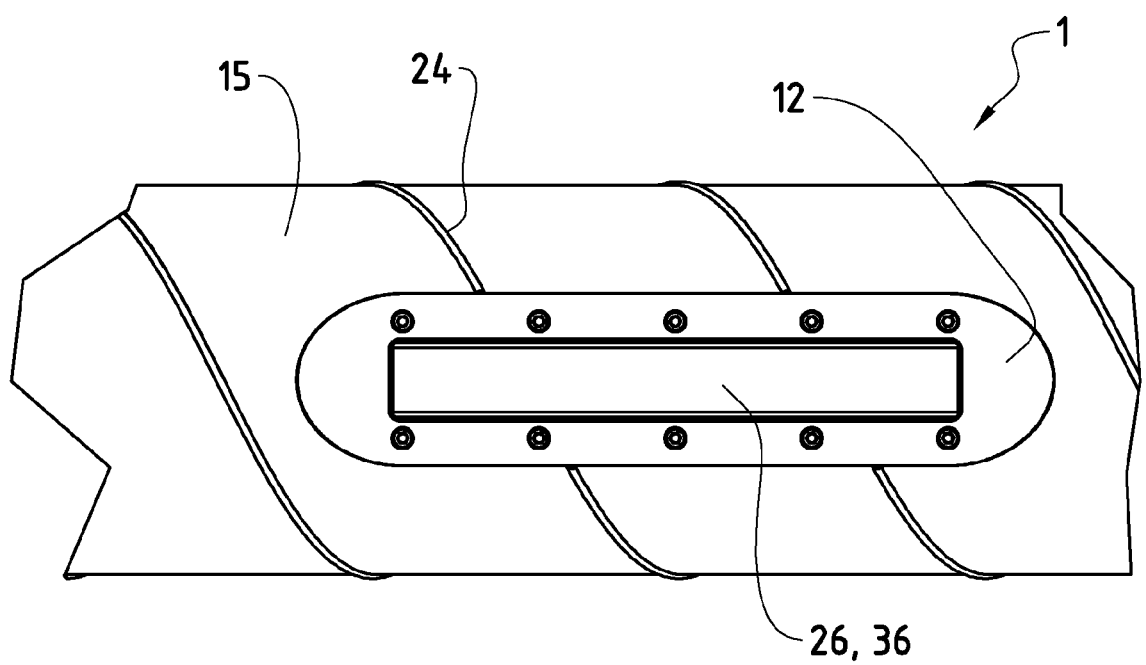
FIG. 6 is a schematic top view of the hybrid pipe according to an eighth embodiment.

The reinforcing element 12 is ideally made of a hard material such as a metal. A rectangular shaped opening 26 is provided at the reinforcing element 12. The opening 26 not only substantially reduces an overall weight of the reinforcing element 12, it also matches the opening 36 of the wall 15 such that they give access from the outside of the hybrid pipe 1 to the pocket area 16 formed by the reinforcing element 22 as can be seen in FIG. 6. Thereby, supplementary devices such as light elements 33 could be installed in the openings and connected for example to electrical cables running inside the pocket area 16.

To this end, it is reiterated that buckling occurs when compressive forces overcome an object's ability to handle compression, and snapping occurs when the tensile forces overcome an object's ability to handle tension. On another note, co-efficient of thermal expansion (or thermal dilatation coefficient) is defined as the fractional increase in strain per unit rise in temperature. Therefore, it describes how the size of an object changes with a change in temperature. Compression strength, tensile strength and thermal dilatation of different materials have generally been well studied and analysed through numerous tests carried out by several international organisations (e.g. ASTM standard test D695, E9, E289, etc.).

A skilled person will of course also understand that the hybrid pipe according to the present invention is suitable for suspension bridge or other similar structures.

To this end, it becomes obvious that the reinforcing element 12, 22 does not need to completely encircle the entire surface of the wall 15 to render a higher mechanical resistance (higher buckling resistance, higher tensile strength, lower thermal dilatation coefficient). In most, if not all, of the embodiments, the reinforcing element 12, 22 can be provided at only a certain area along/around the pipe 10, either at a single point or multiple points of the circumference of the wall 15. The reinforcing element 12, 22 can for instance be in a form of a longitudinal strip, short repetitive strip or a plate as shown in the figures. The reinforcing element can be provided at different width, for instance from 1 cm to 100 cm, preferably 10 to 50 cm, or 5 cm to 20 cm or in any other dimensions which are within common general knowledge of a skilled person.

REFERENCE NUMBER 1 hybrid pipe
10 pipe
12, 22 reinforcing element
15 wall
16, 16', 16" pocket area
17 channel
18 internal face
19 external face
24 ribs
26, 27 opening of the reinforcing element
33 supplementary device (e.g. light element, heating element, surveillance element)
34 flange
35 connector flange
36 opening of the wall
44 fixing means
46 holding means
56 high strength tensile element

What is claimed is:

1. A hybrid pipe for stay cable, comprising a tubular shaped wall having an internal face and an external face, at least one reinforcing element provided at the wall to form the hybrid pipe such that the hybrid pipe has a higher mechanical resistance and/or a lower thermal dilatation coefficient than the wall itself, wherein a plurality of openings are provided on the wall corresponding to the at least one reinforcing element, and wherein the plurality of openings is arranged in such a way that the plurality of openings is encased at least on one side by the at least one reinforcing element.

2. The hybrid pipe according to claim 1, wherein the at least one reinforcing element is attached at the wall in a watertight way.

3. The hybrid pipe according to claim 1, wherein the at least one reinforcing element is attached at the wall in such a way that at least one longitudinal pocket area is formed along the wall.

4. The hybrid pipe according to claim 1, wherein the at least one reinforcing element has a curved profile forming at least one channel able to accommodate one or more high strength tensile elements such as steel strand wires, fibre wires and/or high strength ropes.

5. The hybrid pipe according to claim 1, wherein the at least one reinforcing element is a longitudinal plate.

6. The hybrid pipe according to claim 1, wherein the at least one reinforcing element is made of at least one metal element.

7. The hybrid pipe according to claim 1, wherein the at least one reinforcing element comprises a first reinforcing element having a curved profile adjacent to the internal face of the wall, and a second reinforcing element having a profile of a longitudinal plate adjacent to the external face of the wall.

8. The hybrid pipe according to claim 1, further comprising a plurality of supplementary devices provided at openings of the wall.

9. The hybrid pipe according to claim 1, wherein the external face of the wall has one or more ribs and/or dimples.

10. The hybrid pipe according to claim 1, wherein the wall is made of one or more layers of plastic material.

11. The hybrid pipe according to claim 1, wherein two, three or more pocket areas are provided at different circumferential positions of the wall.

12. The hybrid pipe according to claim 1, wherein the at least one reinforcing element is mechanically fixed relative to each end of the wall.

13. A method of manufacturing a hybrid pipe for stay cable, comprising the steps of:
   a. connecting a plurality of pipe sections to obtain a required length of pipe having a tubular shaped wall,
   b. connecting one or more reinforcing elements on the wall, c. forming at least one channel at the wall with the one or more reinforcing elements and introducing high strength tensile elements into said channel.

14. The method according to claim 13, further comprising one or more of the following steps:
   a. forming at least one pocket area at the wall with the one or more reinforcing elements;
   b. pulling in or pushing in one or more strand bundles into the hybrid pipe;
   c. producing a plurality of openings at the wall; and/or
   d. assembling supplementary devices at openings of the wall.

15. The method according to claim 13, wherein step (b) thereof is performed with the method of bolting, riveting, clamping, screwing, brazing or welding.

16. The hybrid pipe according to claim 5, said longitudinal plate comprising one or more openings.

17. The hybrid pipe according to claim 8, said supplementary devices comprising one or more of lighting elements, heating elements and/or monitoring elements.

18. The hybrid pipe according to claim 10, said plastic material being selected from among thermoplastic, polyethylene and/or high-density polyethylene.

19. The method according to claim 14, said supplementary devices being selected from among light elements, heating elements and/or surveillance elements.

20. The hybrid pipe according to claim 1, said at least one reinforcing element resulting in the hybrid pipe having a lower thermal dilation coefficient than the wall itself.

* * * * *